United States Patent [19]

Steer

[11] 4,212,411
[45] Jul. 15, 1980

[54] MASTER CYLINDER RESERVOIR COVER

[75] Inventor: John E. Steer, South Bend, Ind.

[73] Assignee: The Bendix Corporation, Southfield, Mich.

[21] Appl. No.: 914,307

[22] Filed: Jun. 12, 1978

[51] Int. Cl.² .................. B65D 43/08; B65D 43/12; B65D 53/00
[52] U.S. Cl. ................... 220/347; 60/592; 220/356; 220/358
[58] Field of Search .......... 220/345, 346, 347, 301, 220/302, 293, 295, 343, 352, 356, 358; 60/562, 581, 592; 215/217, 218, 222, 332

[56] References Cited

U.S. PATENT DOCUMENTS

| 784,513 | 3/1905 | Brockelbank | 215/332 |
|---|---|---|---|
| 888,818 | 5/1908 | Karrmann | 215/332 |
| 1,927,029 | 9/1933 | Hammer | 220/302 |
| 2,071,265 | 2/1937 | Schmidt | 220/301 |
| 2,503,693 | 4/1950 | van Lennet | 220/345 X |
| 3,068,651 | 12/1962 | Shutt | 60/562 |
| 3,072,276 | 1/1963 | Nichols | 215/222 |
| 3,077,283 | 2/1963 | Shutt et al. | 220/374 |
| 3,126,444 | 3/1964 | Taylor | 220/345 X |
| 3,317,079 | 5/1967 | Ferrell et al. | 220/301 |
| 3,344,944 | 10/1967 | Shutt et al. | 220/208 |
| 3,494,131 | 2/1970 | Shutt | 60/581 |
| 3,716,161 | 2/1973 | Julian et al. | 215/217 |
| 4,048,050 | 9/1977 | Hillman | 220/346 X |

FOREIGN PATENT DOCUMENTS

| 156713 | 11/1932 | Fed. Rep. of Germany | 215/332 |
|---|---|---|---|
| 568471 | 10/1957 | Italy | 220/346 |
| 508855 | 7/1939 | United Kingdom | 220/345 |
| 1161323 | 8/1969 | United Kingdom | 215/222 |

*Primary Examiner*—Allan N. Shoap
*Attorney, Agent, or Firm*—Ken C. Decker; Leo H. McCormick, Jr.

[57] ABSTRACT

A cover for a reservoir of a master cylinder. The housing of the master cylinder has a plurality of vertical slots located in a flange that surrounds the reservoir. Each of the vertical slots is connected to a locking surface by a slanted surface on the flange. A diaphragm has a series of tabs which are located in the slots to align expandable sections thereon with the reservoir. The cover has a lip with a series of detents located in the lip. To attach the cover to the housing, the detents are located in the slots in the flange and a vertical force is thereafter applied to compress the diaphragm between the flange and the cover. A horizontal force then moves the detents from the slots and over the slanted surface to the locking surface to maintain the seal between the housing and the cover.

7 Claims, 10 Drawing Figures

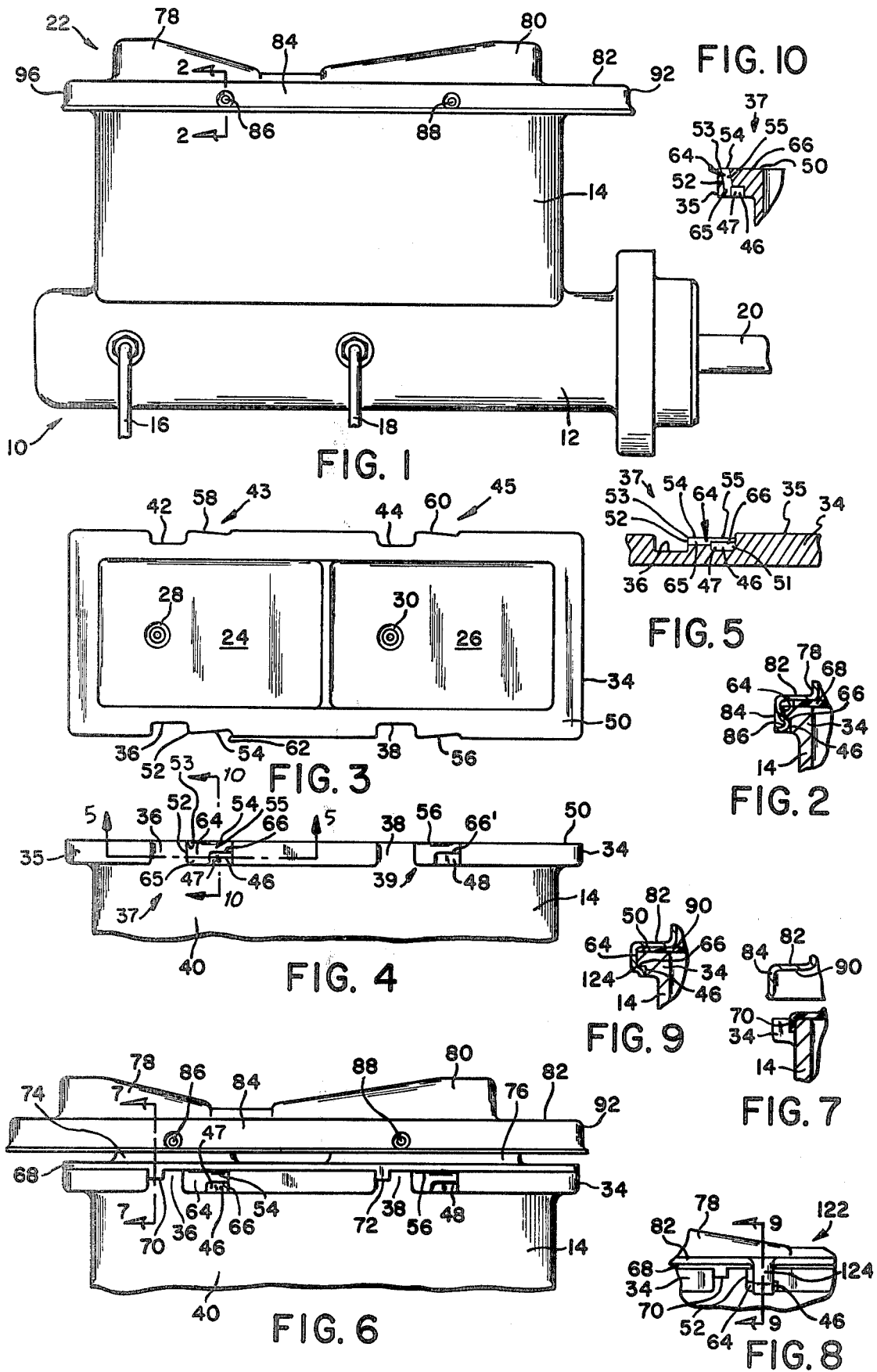

MASTER CYLINDER RESERVOIR COVER

BACKGROUND OF THE INVENTION

This invention relates to a cover for a reservoir of a master cylinder.

Covers for reservoirs that hold a reserve quantity of brake fluid for a master cylinder have been attached to housings in a variety of ways.

Initially all covers were filler caps that were attached to a housing by threaded connections such as disclosed in U.S. Pat. No. 3,068,651. Unfortunately, the threads could be damaged by an operator on replacing the cap after checking the level of brake fluid. Unless the cap is completely tight against the housing, a leak path to the surrounding environment for brake fluid can occur. Thereafter, it was decided that an effort should be made to reduce the possibility of damaging the sealing components of the cover. It was suggested that the cover could be made of a plastic member which snapped onto the housing of the master cylinder reservoir, such as disclosed in U.S. Pat. No. 3,077,283. This type of cover was more economical to produce, however, because of the coefficient of expansion for the metal master cylinder reservoir housing and the plastic cover during extreme temperature, it was possible under some conditions to create sufficient pressure in the reservoir to blow the plastic cover off the metal housing. Thus, it became apparent that a lock such as disclosed in U.S. Pat. No. 3,317,079 was necessary to assure that the reservoir was sealed from the environment under all operating conditions. Unfortunately, because of space problems such locking structure cannot be used on all vehicles. Thus, covers were again attached to the reservoir housings through bolts such as disclosed in U.S. Pat. No. 3,344,944. This type of attachment is completely adequate, however, a similar method of attachment was desired and as a result, the bail wire structure such as disclosed in U.S. Pat. No. 3,494,131 was developed. The bail wire type attachment structure is currently used on the majority of master cylinders used on vehicles manufactured in the United States.

SUMMARY OF THE INVENTION

In a further effort to simplify the manufacturing and structural components of a master cylinder it has been discovered that the cover of a master cylinder can be attached to the housing through a locking structure.

The locking structure includes a flange that surrounds the periphery of the reservoir housing. A series of vertical slots are located on two opposite sides of the flange. A slanted surface connects each slot to a locking section in the flange. A diaphragm which covers the reservoir has a corresponding series of tabs that are located in the vertical slots in the housing to align the diaphragm with the reservoir. A cover has a peripheral ledge with a lip thereon. A series of detents which are located on opposite sides of the lip are located in the slots. A vertical force is applied to the cover to compress the diaphragm between the cover and the reservoir housing. A horizontal force applied to the cover to slide the detents over the slanted surfaces and into the locking section. The position of the detents in the locking section maintain the seal between the housing and the cover.

It is an object of this invention to provide a locking structure for attaching a cover to a reservoir.

It is a further object of this invention to provide a snap-on cover to a reservoir of a master cylinder.

These and other objects should be apparent from reading this specification while viewing the drawings.

BRIEF DESCRIPTION OF THE DRAWINGS

FIG. 1 is a side view of a master cylinder having a cover attached to a reservoir in a manner disclosed by this invention;

FIG. 2 is a sectional view taken along line 2—2 of FIG. 1;

FIG. 3 is a top view of the master cylinder in FIG. 1 with the cover removed from the reservoir housing;

FIG. 4 is a side view of a portion of the master cylinder of FIG. 1 with the cover removed from the reservoir housing;

FIG. 5 is a sectional view taken on line 5—5 of FIG. 4;

FIG. 6 is a side view of a portion of the master cylinder of FIG. 1 showing the reservoir housing, the diaphragm and the cover in a spaced apart relationship;

FIG. 7 is a sectional view taken along line 7—7 of FIG. 6;

FIG. 8 is a side view of a secondary cover and locking structure made according to this invention; and FIG. 9 is a sectional view taken along line 9—9 of FIG. 8;

FIG. 10 is a sectional view taken along line 10—10 of FIG. 4.

DETAILED DESCRIPTION OF THE INVENTION

The master cylinder 10 shown in FIG. 1 has a cylindrical housing 12 with a reservoir 14 attached thereto. The cylindrical housing 12 has a bore therein which is divided into a primary chamber and a secondary chamber by primary and secondary pistons (not shown). The primary chamber is connected to the front brakes of a vehicle by conduit 16 while the secondary chamber is connected to the rear brakes by conduit 18. A push rod 20 which is connected to a brake pedal moves the primary and secondary pistons in response to an operator input to effect a brake application.

On termination of the operator input, a return spring in the bore of the cylindrical housing moves the primary and secondary to an idle position wherein the reservoir is communicated to the primary and secondary chambers through compensator ports 28 and 30, respectively, see FIG. 3.

A cover 22 which is attached to the reservoir 14 in a manner disclosed by this invention assures that a reserve quantity of brake fluid retained in chambers 24 and 26 is not lost to the surrounding environment or contaminated by any outside element in the environment.

In more particular detail, reservoir 14 has a flange 34 which defines a peripheral surface 35 thereon, see FIGS. 3 and 4. The flange 34 also defines a top or sealing surface 50. A first series of vertical slots or grooves 36 and 38 are located on a first side 40 of the reservoir housing while a second series of vertical slots 42 and 44 are located directly opposite thereto on a second side. Each slot 36, 38, 42 and 44 is adjacent to a locking surface or section 37, 39, 43, and 45.

Each of the locking sections are identical and therefore only locking section 37 will be described in detail.

As best shown in FIGS. 4, 5, 6, and 10, locking section 37 includes a first substantially radially outwardly facing planer surface 64 tilted at an acute angle with respect to the peripheral surface 35 of flange 34. Surface 64 includes a first portion 65 which extends in a generally vertical direction adjacent groove or slot 36 and a second portion 55 which extends in a generally horizontal direction away from groove 36, when viewing FIG. 4. Surface 64 has a substantially vertically extending edge 52 adjacent groove 36 and substantially horizontally extending edge 54 which is defined by the intersection of the top surface 50 of flange 34 with tilted surface 64. The apex 53 of surface 64 is defined by the intersection of edges 52 and 54.

Locking section 37 also includes a second substantially outwardly facing surface 46 depressed relative to surface 64, as best shown in FIGS. 2, 4, 5, and 10. A curved transitional surface or abutment surface 47 interconnects the depressed second surface 46 with portion 65 of surface 64. Portion 55 of first surface 64 and the depressed surface 46 are interconnected by a vertically downward facing shoulder or abutment surface 66, as best shown in FIGS. 5 and 10. As best seen in FIG. 4, the portion 65 of surface 64 is disposed between depressed surface 46 and the groove 36.

As shown in FIGS. 6 and 7, a diaphragm 68 has a series of tabs, only 70 and 72 are shown, that are located in slots 36, 38, 42 and 44 to position expandable sections 74 and 76 over chamber 24 and 26.

The cover 22 has domes 78 and 80 that extend from a base 82. A lip 84 extends from base 82. Lip 84 includes a series of detents, of which only 86 and 88 are shown in FIGS. 1 and 6, that are designed to engage the abutments of the corresponding locking sections, such as abutment 66 of locking section 37, best shown in FIG. 5. The cover 22 includes a sealing surface 90 which engages the diaphragm 58. The lip 84 of cover 22 is longer than the flange 34 of housing 14 so that the cover 22 can be moved horizontally after the diaphragm has been compressed.

METHOD OF ASSEMBLY OF THE INVENTION

The cover 22 and diaphragm 68 are attached to and removed from the reservoir housing 14 of the master cylinder 12 in the following manner:

The tabs, only 70 and 72 are shown, on the diaphragm 68 are located in vertical slots 36, 38, 42 and 44 in flange 34 on the reservoir housing 14 to position expandable sections 74 and 76 over chambers 24 and 26.

End 92 of cover 22 is located over end 34 of reservoir housing 14 in a manner shown in FIG. 6 to align detents, only 86 and 88 being shown, over vertical slots 36, 38, 42 and 44 in flange 34. A vertical force is applied to cover 22 to locate the detents, of which 86 and 88 are typical, in slots 36, 38, 42 and 44 and to compress the diaphragm 68 between sealing surface 50 and 90.

Thereafter, a horizontal force is applied to end 96 of cover 22 causing detent 86 to slide horizontally over slanted surface 65, over transition or abutment surface 47 and into a locked position opposite depressed surface 46. In this locked position, abutment surface 47 is engageable with detent 86 to resist horizontal movement of cover 22 out of the locked position and abutment 66 engages detent 86 to resist the vertical removal of cover 22. The engagement of detent 86 with abutment 66 and the resiliency of the material comprising lip 82 causes a constant vertical force to be applied through sealing surface 90 to seal diaphragm 68 with sealing surface 50.

The cover 22 can be removed from the reservoir housing by moving the cover 22 horizontally to cause detent 86 to move out of the locked position opposite depressed surface 46, over transition or abutment surface 47, over portion 65 of tilted surface 64 and into vertical slot 36.

Thereafter, the cap 22 is lifted from the reservoir housing and tabs on the diaphragm 68 may be removed from the slots to allow the diaphragm 68 to be removed and the chambers 24 and 26 exposed for investigation as to the fluid level therein.

While the above described method is the preferred described method of assembly, it has been determined that the cap 22 may be attached to the reservoir housing 14 by aligning the detents over the locking sections on the flange 34 and applying a vertical force. The material of lip 84 expands sufficiently to allow the detents to slide down the acute face of the tapered sections. However, it has been determined that the detents on lip 84 could be sheared off by the sharp edge of the abutment on the locking surface section if the cover 22 is removed by the application of a vertical force to the cover 22 without first moving the cover in a horizontal direction toward the vertical slots.

For some applications it has been determined that lip 84 may not be needed to protect diaphragm 68 from contamination. Therefore, the cover was redesigned in a manner illustrated in FIG. 8. The cover 122 in FIG. 8 has a ledge 82 with a plurality of clips, only 124 being shown, that are attached thereto. The clips which are located in the locking sections, i.e., clip 124 in locking section 37 as shown in FIGS. 8 and 9, provide a vertical resilient force for holding sealing surface 90 against diaphragm 86 and surface 50 to seal the reservoir housing from the surrounding environment.

I claim:
1. A container comprising:
   a housing defining a chamber for retaining fluid therein, said housing having a flange surrounding an opening to said chamber, said flange having an upwardly facing, planar, horizontal surface and a radial, outwardly facing, planar, vertical surface said flange having a series of vertically extending grooves on the peripheral surface thereof and extending through the horizontal and vertical surfaces, said vertical surface having a cover locking section adjacent one side of each of said grooves, each cover locking section comprising a portion of said vertical surface slanted at an acute angle with respect to said horizontal surface adjacent said grooves, and a second portion depressed relative to the slanted surface, the depressed surface and said slanted surface cooperating to define horizontal and vertical abutments therebetween;
   a diaphragm member surrounding the opening of said housing; and
   cover means having a peripheral lip thereon, said peripheral lip having a series of detents projecting radially inwardly therefrom, said detents traveling over one of said horizontal and vertical abutments as said cover means is attached to said housing, said abutments being engageable with said detents to resist removal of said cover means from said housing, and to hold said diaphragm against said housing and seal said chamber from the surrounding environment.
2. The container of claim 1, wherein:
   said slanted surface comprise a generally axially extending portion adjacent the respective groove and a generally laterally extending portion adjacent said horizontal surface and said axially extending surface, said slanted surface having a substantially vertical edge adjacent said groove and a substantially horizontal edge defined by an intersection of said slanted surface with said horizontal surface of said flange, an apex of said slanted surface being defined by the intersection of said edges; and said axially extending portion being disposed between said depressed surface and said groove, said axially extending portion and said depressed surface cooperating to define a first one of said abutments therebetween comprised of a curved surface, said laterally extending portion and said depressed surface cooperating to define a second one of said abutments therebetween comprised of a downwardly facing surface.

3. The container, as recited in claim 12, wherein said diaphragm member further includes:

a series of tabs aligned with said series of grooves for holding said diaphragm in a substantially fixed position with respect to said opening.

4. The container, as recited in claim 3, wherein said lip of said cover means is longer than the housing flange to allow an operator to horizontally move said detent from a locking position opposite said depressed surface, wherein said second abutment is engageable with said detent to resist vertical removal of said cover means from said housing, over said slanted surface and into said groove to allow said cover means to be removed vertically from said housing.

5. In a master cylinder having a housing defining a reservoir therein for containing brake fluid, the improvement comprising a fastening means for attaching a cap to said housing comprising:

a flange surrounding an opening to said reservoir, said flange having an upwardly facing, planar, horizontal surface and a radial, outwardly facing, planar, vertical surface said flange having a series of vertically extending grooves on the peripheral surface thereof and extending through the horizontal and vertical surfaces, said vertical surface having a cover locking section adjacent one side of each of said grooves, each cover locking section comprising a first portion of said vertical surface slanted at an acute angle with respect to said horizontal surface adjacent said grooves, the slanted surface comprises a generally axially extending portion adjacent the respective groove and a generally laterally extending portion adjacent said horizontal surface and said axially extending surface, and slanted surface having a vertical edge adjacent said groove and a horizontal edge defined by an intersection of said slanted surface with said horizontal surface of said flange, an apex of said slanted surface being defined by the intersection of said edges, said cover locking section also comprising a substantially radially outwardly facing surface depressed relative to said slanted surface, the depressed surface and said slanted surface cooperating to define horizontal and vertical abutments therebetween, said axially extending portion being disposed between said depressed surface and said groove, said axially extending portion and said depressed surface cooperating to define a first one of said abutments therebetween comprised of a curved surface, said laterally extending portion and said depressed surface cooperating to define a second one of said abutments therebetween comprised of a downwardly facing surface;

a diaphragm member surrounding the opening of said housing; and cover means having a peripheral lip thereon, said peripheral lip having a series of detents projecting radially inwardly therefrom, said abutments being engageable with said detents to resist removal of said cover means from said housing and to hold said diaphragm against said housing and seal said reservoir from the surrounding environment.

6. In the master cylinder, as recited in claim 5 wherein said sealing means includes:

a lip for engaging the housing:

a flexible portion for maintaining a substantially constant relationship with fluid in said reservoir; and a series of tabs extending from said lip, each of said tabs being capable of extending into and cooperating with a corresponding groove in said series of grooves to hold said sealing means stationary with respect to said housing on movement of said cap.

7. In the master cylinner, as recited in claim 6, wherein said cap includes:

a lip which extends from and surrounds said sealing surface for covering said sealing means to reduce communication of possible continents to said sealing surfaces.

* * * * *